Nov. 19, 1935.   N. CORDEROY   2,021,591
MILKING MACHINE INSTALLATION
Filed Feb. 7, 1935   3 Sheets-Sheet 1

WITNESS:

INVENTOR
Neel Corderoy
BY
ATTORNEYS.

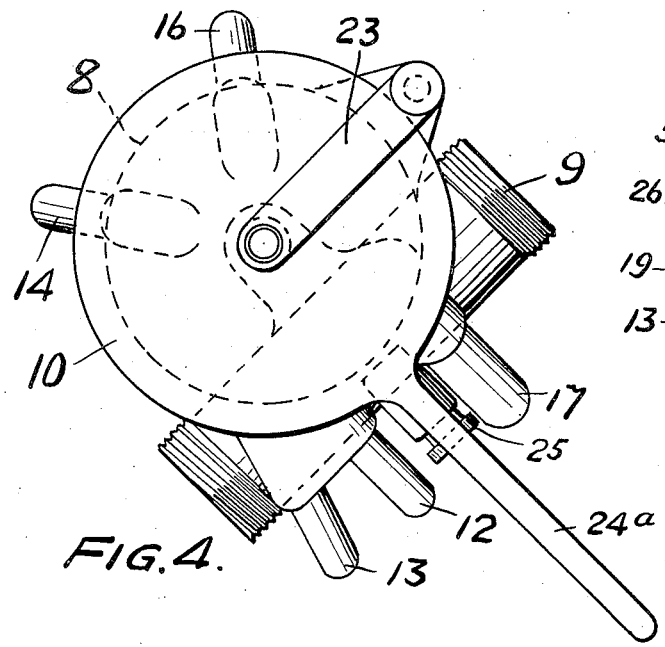
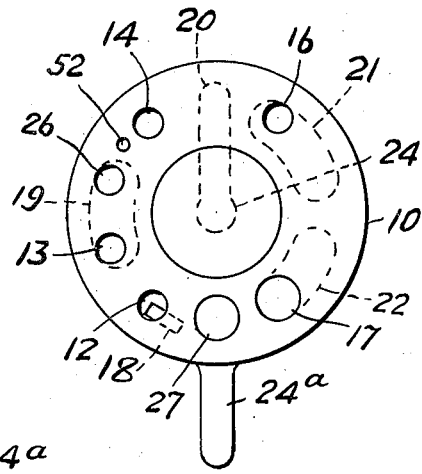
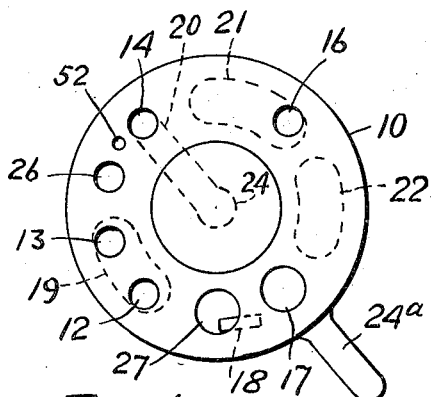
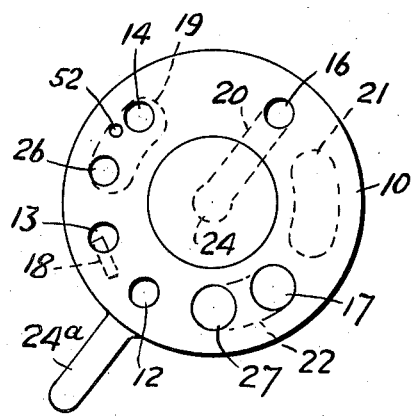
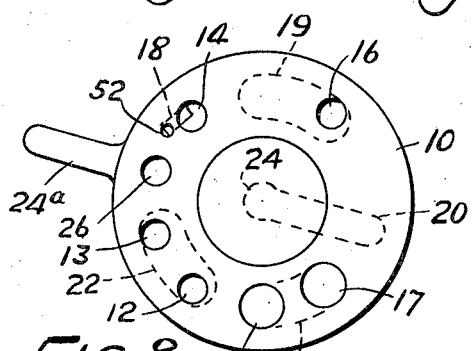

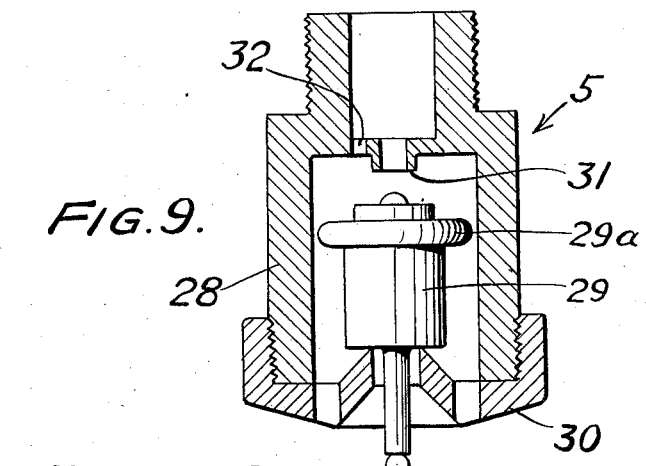
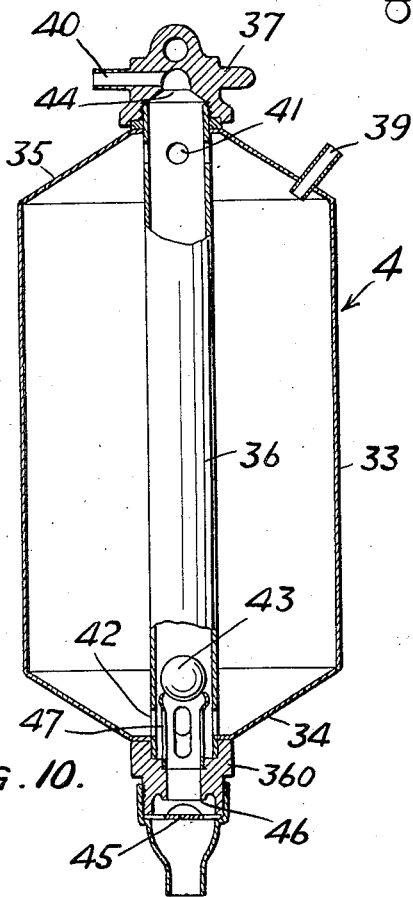
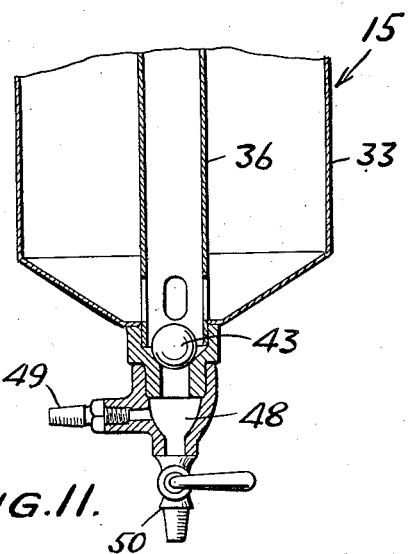

Patented Nov. 19, 1935

2,021,591

UNITED STATES PATENT OFFICE 2,021,591

MILKING MACHINE INSTALLATION

Neel Corderoy, Brentford, England, assignor to The De Laval Separator Company, New York, N. Y., a corporation of New Jersey Application February 7, 1935, Serial No. 5,335
In Sweden February 28, 1934

13 Claims. (Cl. 31—58)

In milking machine installations of the type wherein the milk flows from the milking machines through closed evacuated pipes, it is often conveyed into a so-called releaser, which is caused to discharge the milk into a vessel under atmospheric pressure either by manually operated cocks or by means operating automatically after a given volume has collected. In the former case a cock is opened at the place of milking so as to admit atmospheric air into a pipe line running to the releaser. The air is thus taken from the place of milking and there is therefore a certain risk that it may be more or less contaminated.

The present invention relates, in part, to devices by means of which manual operation of the releaser may be controlled while avoiding the risk specified. The atmospheric air necessary for the operation of the releaser is not taken from the place of milking but from the chamber in which the releaser is located or from another chamber containing pure air. Another object of the invention is to operate the releaser with the aid of a cock which is also used for controlling other milking procedures. The operator thus only has to use a single cock, which controls both the filling and the emptying of a collecting vessel that may be located at the place of milking and the emptying and filling of the releaser. The invention also relates to certain structural features of the said cock which are adapted to the said purpose; to an automatic valve designed for the supply of air to the releaser; and to structural features associated with the container of the releaser as well as of the vessel located at the place of milking for receiving the milk from the teat cups and in which the milk is measured.

Figs. 5, 6, 7 and 8 are plan views, somewhat diagrammatic, showing the master cock in different operative positions.

Fig. 9 is a vertical sectional view of the automatic valve for admitting air to the releaser when the vacuum connection thereto is shut off.

Fig. 10 is a vertical sectional view of the releaser.

Fig. 11 is a vertical sectional view of the releaser slightly modified to adapt it for use as the milk collecting vessel of the system.

Figure 1:
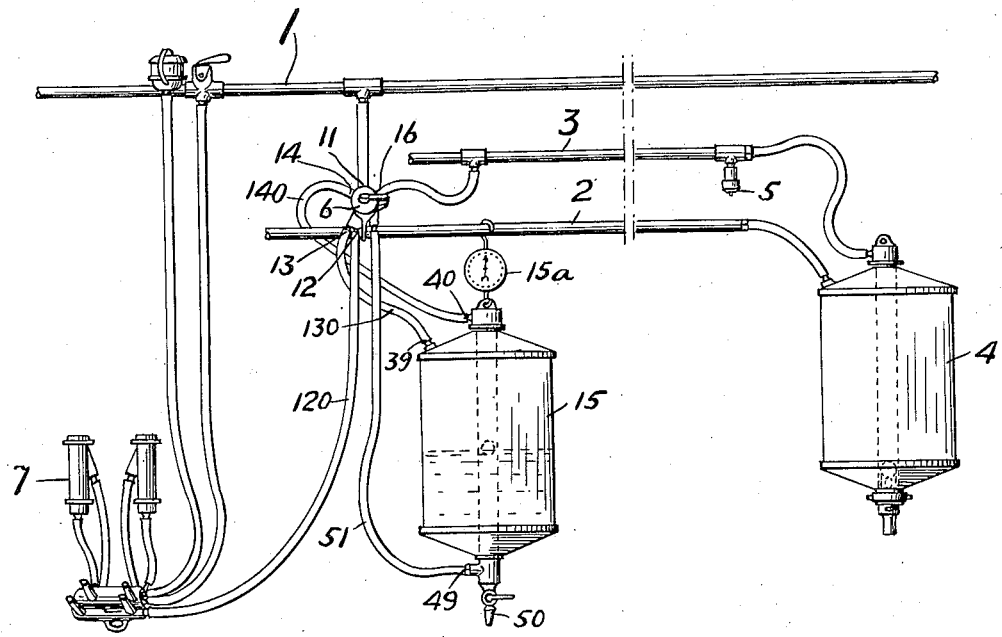
Fig. 1 is a side elevation, somewhat diagrammatic, showing a milking machine installation in which my invention is embodied.

As shown in Fig. 1, a vacuum pipe 1 communicates with the pump (not shown) of the installation. Pipe 2 is a milk pipe for conveying milk from the teat cup, either directly or (as shown in the installations) through intermediate milk collecting vessels, such as 15, to a releaser 4, which can be evacuated through the vacuum pipe 3; the milk, under the influence of the vacuum, being sucked, as hereinafter described, into the milk pipe 2 and thence into the releaser 4.

The vacuum pipe 3 is provided with an automatic valve 5 (hereinafter described) for admitting atmospheric air into the pipe 3 and the releaser 4 when the latter is to be emptied of milk.

The pipe 3 can be closed from communication with the vacuum pipe 1 by a cock 6, which is also arranged to open and close the communication between the teat cups 7 and the rest of the milking system.

Figures 2, 3:
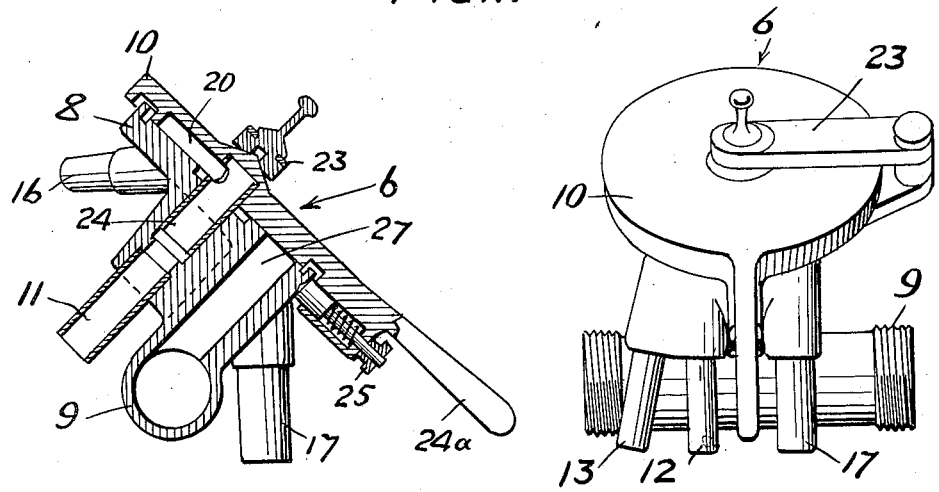
Fig. 2 is a perspective view, Fig. 3 a sectional view, and Fig. 4, a plan view, of the master cock or valve.

As shown in Figs. 2 to 4 the cock 6 consists of a valve body or housing 8 which is provided with a tube 9 interposed in the milk pipe line 2. Turnable on the valve body is a valve 10 which is movable into four different positions, as shown in Figs. 5 to 8. The valve body is provided with a number of nipples. Nipple 11 communicates with the vacuum pipe 1, nipple 12 with the teat cups 7, nipples 13 and 14 with the upper part of the milk collecting vessel 15, nipple 16 with the vacuum pipe 3, and nipple 17 with the lower part of the collecting vessel 15.

As will be seen from Figs. 5, 6, 7 and 8, the valve 10 is provided with recesses 18, 19, 20, 21 and 22, by means of which certain connections may be established between certain nipples. The valve 10 is kept on the body 8 by a spring 23 (see Figs. 2 to 4) and is rotatably located in the body 8 by means of a hollow shaft 24, which at one end communicates with the nipple 11 and at the other end with the recess 20. The recess 20 is thus always in communication with the vacuum pipe and is therefore during operation constantly under vacuum. The valve 10 is provided with a handle 24a and with a lock device 25 by means of which it may be fixed in any one of its four different positions.

Fig. 5 shows the valve in closed position, that is, the position in which all the nipples extending from the cock, with the exception of the one communicating with the vacuum pipe 1, are shut off from the vacuum.

Before the milking is begun the handle 24a is turned one step to the right into the position shown in Fig. 6. The upper part of the milk pail 15 is thereby put into communication with the vacuum pipe 1 through recess 20 and nipple 14, the hose 14a and the nipple 40 on the vessel 15. The teat cups 7 are simultaneously put into communication with the upper part of milk pail 15 through the hose 120, nipple 12, recess 19, nipple 13, the hose 130 and the nipple 39 on the vessel 15. The milk flowing from the teats is thus collected in the pail 15.

When the milking is finished the quantity of milk produced is determined by taking the readings of a spring balance 15a on which the pail 15 hangs. The valve is then turned to the position illustrated in Fig. 7 so as to put the vacuum pipe 1 into communication with the upper part of the releaser 4 through recess 20 and nipple 16; the valve 5 then automatically closing (as hereinafter described) so that the releaser 4 is evacuated. In this latter position the valve 10 also puts the upper part of the milk pail 15 into communication with the outer atmosphere by putting nipple 14, through recess 19, into communication with a channel 26 opening to the atmosphere. Simultaneously the lower part of the milk pail 15 is put into communication with the milk pipe 2 through hose 51, nipple 17, recess 22 and channel 27. The milk then flows from the pail 15 through the pipe 2 into the releaser 4. After the pail 15 has been emptied, valve 10 is again brought into the position shown in Fig. 5, or it is adjusted for continued milking by bringing it into the position shown in Fig. 6.

The milk has now been transferred from the milk collecting vessel 15 to the releaser 4. The releaser is automatically emptied of such received milk after the valve 10 has been moved into either of the positions shown in Figs. 5 and 6, as the connection of nipple 16 with the vacuum pipe has been closed, which allows the valve 5 to open for the introduction of atmospheric air into the releaser so as to effect the discharge of the milk contained therein. This valve 5 will now be described.

Referring to Fig. 9: the valve 5 comprises a housing 28, a valve body 29 and a cover 30. At its upper part housing 28 is provided with a valve seat 31, and at the side thereof is a small hole 32 which cannot be closed by the valve body 29. The latter is provided with an annular flange 29a, which is of such diameter as to provide a throttled passage between the valve body and the wall of the housing 28.

The valve 5 operates in the following manner: When the cock 6 is adjusted for emptying of the pail according to Fig. 7, pipe 3 is put under vacuum, the valve body 29 then, owing to the throttle between it and the wall of the housing 28, being lifted towards the valve seat, so that communication between pipe 3 and the outer air is closed and the releaser 4 is evacuated. Through the hole 32 a small amount of air still streams into the pipe 3 but is sucked out by the pump of the installation. The hole 32 should be so small that only an insignificant quantity of air is sucked in. When the cock 6 is moved away from its position shown in Fig. 7 into either the position for continued milking or the position for total closing, the air current from the pipe 3 to the vacuum pump ceases, and owing to the air streaming in through the hole 32 the pressure slowly increases to atmospheric pressure. At a given pressure in the pipe 3 lying between the atmospheric pressure and the vacuum in the system, the valve body 29 falls down owing to its weight, so that the communication between the atmosphere and pipe 3 is re-established and air at atmospheric pressure quickly streams into the releaser.

The construction of the releaser is shown more in detail in Fig. 10. The releaser consists of a cylindric wall 33, which is suitably of glass, a bottom 34 and a cover 35. Through central openings in the bottom and cover extends a tube 36, whose lower end is supported by a holder 360 engaging the bottom 34. By means of a nut 37 at the top of tube 36, the parts are held together. The cover is provided with two nipples 39 and 40, of which 39 connects the releaser with the milk pipe 2 and 40 with the pipe 3. Near its opposite ends the central tube is provided with openings 41 and 42, the former for the evacuation of the chamber and the latter for the discharge of the milk from the chamber. In the tube 36 is a float 43, which may be a rubber ball. The float of course rises with the milk level. Before that reaches the air exhaust nipple 40 the float closes a hole 44 in the nut 37 and thereby closes communication of the chamber with vacuum, so that the flow of milk through the channel 39 ceases.

The bottom 34 of the releaser is provided with a non-return valve 45, which is kept on a seat 46 by the difference of pressure between the atmospheric pressure and the lower pressure prevailing in the releaser. After this difference of pressure has disappeared, the valve body 45 falls to a lower position, so that the milk can flow out past it and the releaser is thus emptied. In order that the float 43 shall not close the outlet, its downward movement is limited by a spacer 47 resting on a shoulder on the holder 360.

It is preferred to make the milk collecting vessel 15 and the milk releaser 4 substantially interchangeable. The releaser 4 may be converted into the collecting vessel 15 by the simple expedient of removing from the former the spacer 47 and the check valve 45 and substituting a casing 48 (see Fig. 11), which is provided with a nipple 49 for connection, through hose 51, with the cock 6, and with a cock 50 for taking milk samples. The float 43 fills the same purpose as in the releaser 4, as it closes the vacuum pipe 40 when too much liquid flows in, but it has here also another purpose. When flowing from the vessel 15 to the releaser the milk discharges through the nipple 49. If now the cock 6 were left in the position to admit air to the vessel 15 after the vessel 15 had been emptied, the air in the vessel 15 would still continue to stream through the nipple 49 (which would be objectionable in regard to the other apparatus connected to the system) if the down movement of the float were arrested by the spacer 47. But with the spacer 47 removed, the float 43 continues to sink until it closes the communication between the vessel 15 and the nipple 49, so that the flow of air is prevented.

The installation of course comprises, in addition to the above parts, a device for generating the pulsations in the teat cups. This device may be of known or any type and need not be described, since it forms no part of the invention.

After the milking has been finished an installation of the type under consideration must be cleaned and sterilized. This is effected in the following manner: After the vacuum pump has been stopped, the valve 10 is put into the position shown in Fig. 8. The releaser is disconnected from the milk pipe 2 which is then put into communication with a pipe (not shown) for steam or other cleaning agent. The cleaning agent now flows through the milk pipe 2, the channel 27, the recess 21 and the hose nipple 17 towards the bottom of the milk pail 15, entering through the nipple 49 and flowing through the pail and then to the nipple 39, the nipple 13 of the cock 6 and through the recess 22 to the nipple 12, and then finally leaves the installation through the teat cups 7. The part 10 of the valve is also provided with a small recess 18 and the body 8 with a small hole 52 (see Figs. 5, 6 and 7) leading to the atmosphere. In the position illustrated in Fig. 8 the channels 14 and 52 communicate, so that the cleaning agent discharges also this way, the communication between the nipples 40 and 14 thus also being cleaned and sterilized.

Where the atmosphere, or air at atmospheric pressure, and a vacuum or partial vacuum are specified in the claims, it will be understood that they are intended to be equivalents respectively to air under any practicable relatively high and low absolute pressures.

What I claim and desire to protect by Letters Patent is:

1. A milking machine installation comprising a milk pipe line, a releaser adapted when under vacuum to receive milk from the milk pipe line, a vacuum pipe, an air pipe communicating with the releaser, a manually operable valve movable into positions to connect and disconnect the air pipe with the vacuum pipe, and a valve on the air pipe movable, when said valve is moved to disconnect the air pipe from the vacuum pipe line, to connect the air pipe with the atmosphere.

2. A milking machine installation comprising a milk releaser, a milk pipe line adapted to discharge milk into the releaser when under vacuum, a vacuum pipe, an air pipe communicating with the releaser and having an air port, a manually operable valve movable to connect and disconnect said air pipe with the vacuum pipe, and a valve, operable when the manually operable valve is movable into said two positions, to respectively close and open said air port.

3. A milking machine installation comprising a milk releaser, a milk pipe line adapted to discharge milk into the releaser when under vacuum, a vacuum pipe, an air pipe communicating with the releaser and having an air port, a manually operable valve movable to connect and disconnect said air pipe with the vacuum pipe, a valve chamber into which said air port opens and having an air inlet, and a valve in said chamber operable, when the air pipe is connected with vacuum, by difference in pressure at said air port and air inlet, to close said air port, and operable, after the air pipe is disconnected from vacuum, to move into position to open said air port.

4. A milking machine installation comprising a milk releaser, a milk pipe line adapted to discharge milk into the releaser when under vacuum, a vacuum pipe, an air pipe communicating with the releaser and having an air port, a manually operable valve movable to connect and disconnect said air pipe with the vacuum pipe, a valve chamber into which said air port opens and having an air inlet, and a valve in said chamber operable, when the air pipe is connected with vacuum, by difference in pressure at said air port and air inlet, to close said air port, and operable, after the air pipe is disconnected from vacuum, to move into position to open said air port, there being a constantly open leak orifice between said valve chamber and air port to allow the air pressure in the air pipe to build up after the air pipe is disconnected from vacuum and thereby sufficiently balance the pressure on opposite sides of the valve to allow it to move into position to open said air port.

5. A milking machine installation comprising a milk releaser, a milk pipe line adapted to discharge milk into the releaser when under vacuum, a vacuum pipe, an air pipe communicating with the releaser and having an air port, a manually operable valve movable to connect and disconnect said air pipe with the vacuum pipe, a valve chamber into which said air port opens and having an air inlet, a valve in said chamber having a peripheral part nearly filling said chamber to allow air entering through said inlet to move the valve to seat it against said air port when said air pipe is connected with vacuum, there being a leakage orifice between said air pipe and valve chamber to allow air pressure to build up in the air pipe when it is disconnected from vacuum, thereby sufficiently balancing the pressure on opposite sides of the valve to unseat it and allow air to flow freely and enter the air pipe and expel milk from the releaser.

6. A milking machine installation comprising a vacuum pipe line, a milk pail, a milk releaser, a milk pipe line communicating with the releaser, an air pipe communicating with the releaser, and valve mechanism adapted, in one position, to connect the vacuum pipe line with the milk pail, disconnect the milk pail from the milk pipe line and disconnect said air pipe from vacuum and in another position to connect the milk pail with the atmosphere and the milk pipe line and connect the air pipe with the vacuum pipe line.

7. A milking machine installation comprising a vacuum pipe line, a milk pail, a milk releaser, a milk pipe line communicating with the releaser, an air pipe communicating with the releaser, valve mechanism adapted, in one position, to connect the vacuum pipe line with the milk pail, disconnect the milk pail from the milk pipe line and disconnect said air pipe from vacuum and in another position to connect the milk pail with the atmosphere and the milk pipe line and connect the air pipe with the vacuum pipe line, and a separate valve adapted, when the connection between the vacuum pipe line and said air pipe is closed, to connect the air pipe with the atmosphere.

8. A milking machine installation comprising a milk receiver, a vacuum pipe line, teat cups, a releaser, and means to connect the teat cups with the milk receiver and thereby allow milk to flow from the teat cups to the milk receiver, and alternately therewith to connect the releaser with the vacuum pipe line and apply pressure fluid to the milk receiver and thus deliver milk to the releaser, said means comprising air and milk conduits and valve mechanism which is movable into two different positions to establish connections between said conduits adapted to effect the specified alternate operations.

9. A milking machine installation comprising a milk pipe line, a vacuum pipe line, a milk releaser, teat cups, a milk pail, and means to connect the teat cups with the milk pail and the milk pail with the vacuum pipe line and thereby withdraw milk from the teat cups into said pail, and alternately therewith to connect the milk pail with atmosphere and with the releaser and to connect the releaser with the vacuum pipe line, said means comprising air and milk conduits and valve mechanism which is movable into two different positions to establish the specified alternate connections.

10. A milking machine installation comprising a milk pipe line, a vacuum pipe line, a milk releaser, teat cups, a milk pail, and means to connect the teat cups with the milk pail and the milk pail with the vacuum pipe line and thereby withdraw milk from the teat cups into said pail, and alternately therewith to connect the milk pail with atmosphere and with the releaser and to connect the releaser with the vacuum pipe line, said means comprising air and milk conduits and valve mechanism which is movable into two different positions to establish the specified alternate connections, said valve mechanism being movable into a third position to connect the milk pail with said milk pipe line and with the conduits communicating with the teat cups to allow a cleaning fluid to flow therethrough.

11. A milking machine installation comprising a milk pipe line, a vacuum pipe line, a milk releaser, teat cups, a milk pail, and means to connect the teat cups with the milk pail and the milk pail with the vacuum pipe line and thereby withdraw milk from the teat cups into said pail, and alternately therewith to connect the milk pail with atmosphere and with the releaser and to connect the releaser with the vacuum pipe line, said means comprising air and milk conduits and valve mechanism which is movable into two different positions to establish the specified alternate connections, said valve mechanism being movable into a third position to connect the milk pail with said milk pipe line and with the conduits communicating with the teat cups and with the air conduit communicating with the milk pail.

12. A milking machine installation comprising teat cups, a milk pail, a source of vacuum, a releaser, a milk pipe line communicating with the releaser, and milk conduits and air conduits radiating from a common locus, one milk conduit extending to the teat cups, two other milk conduits extending to the milk pail, one air conduit extending to the milk pail and another air conduit extending to the releaser, valve mechanism, comprising ports and passages, at said locus, and means to manually move said valve mechanism into one position to connect the first milk conduit with one of the other two milk conduits and the first air conduit with the source of vacuum and into another position to connect the second milk conduit with the milk pipe line, the first air conduit with the milk pail and the second air conduit with vacuum; thereby controlling from a common point the transfer of milk from the teat cups to the milk pail and the discharge of milk from the releaser and alternately therewith the transfer of milk from the milk pail to the releaser.

13. A milking machine installation comprising teat cups, a milk pail, a source of vacuum, a releaser, a milk pipe line communicating with the releaser, and milk conduits and air conduits radiating from a common locus, one milk conduit extending to the teat cups, two other milk conduits extending to the milk pail, one air conduit extending to the milk pail and another air conduit extending to the releaser, valve mechanism, comprising ports and passages, at said locus, and means to manually move said valve mechanism into one position to connect the first milk conduit with one of the other two milk conduits and the first air conduit with the source of vacuum and into another position to connect the second milk conduit with the milk pipe line, the first air conduit with the milk pail and the second air conduit with vacuum; and an automatic valve adapted, in the first defined position of the manually controlled valve mechanism, to connect the releaser with the atmosphere.

NEEL CORDEROY.